(12) United States Patent
Hsieh (10) Patent No.: US 8,164,605 B2
(45) Date of Patent: Apr. 24, 2012

(54) LIQUID CRYSTAL DISPLAY PANEL AND DISPLAY DEVICES

(75) Inventor: Ping-Hsun Hsieh, TaoYuan Hsien (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 381 days.

(21) Appl. No.: 12/499,066

(22) Filed: Jul. 7, 2009

(65) Prior Publication Data

US 2010/0283807 A1 Nov. 11, 2010

(30) Foreign Application Priority Data

May 11, 2009 (TW) .............................. 98115546 A (51) Int. Cl.
*G09G 5/02* (2006.01)
(52) U.S. Cl. .......................................... 345/694; 345/87
(58) Field of Classification Search .................... None
See application file for complete search history.

(56) References Cited

U.S. PATENT DOCUMENTS

| 2005/0116615 A1* | 6/2005 | Matsumoto et al. | 313/500 |
| 2006/0082560 A1* | 4/2006 | Greer et al. | 345/204 |
| 2007/0052887 A1* | 3/2007 | Brown Elliot et al. | 349/108 |
| 2008/0186325 A1* | 8/2008 | Higgins et al. | 345/592 |
| 2008/0231577 A1* | 9/2008 | Lin et al. | 345/90 |
| 2008/0284758 A1* | 11/2008 | Lee et al. | 345/204 |

FOREIGN PATENT DOCUMENTS

| CN | 1870277 A | 11/2006 |
| CN | 101178508 A | 5/2008 |

* cited by examiner

*Primary Examiner* — Amare Mengistu
*Assistant Examiner* — Antonio Xavier
(74) *Attorney, Agent, or Firm* — Winston Hsu; Scott Margo (57) ABSTRACT

A liquid crystal display panel includes a substrate and a plurality of display units. Each display unit includes a first sub-display unit and a second sub-display unit. The first sub-display unit includes a first sub-pixel unit corresponding to a first color, a second sub-pixel unit corresponding to a second color, a third sub-pixel unit corresponding to a third color, and a fourth sub-pixel unit corresponding to a fourth color. The second sub-display unit includes a fifth sub-pixel unit corresponding to the third color, a sixth sub-pixel unit corresponding to the fourth color, a seventh sub-pixel unit corresponding to the first color, and a eighth sub-pixel unit corresponding to the second color.

4 Claims, 12 Drawing Sheets

LIQUID CRYSTAL DISPLAY PANEL AND DISPLAY DEVICES

BACKGROUND OF THE INVENTION

1. Field of the Invention

The present invention is related to a liquid crystal display panel and display devices, and more particularly, to a liquid crystal display panel and display devices capable of enhancing resolution and brightness performance by interleaving sub-pixel units of the liquid crystal display panel.

2. Description of the Prior Art

Liquid crystal display (LCD) devices, characterized by low radiation, small size and low power consumption, have gradually replaced traditional cathode ray tube (CRT) devices and are widely applied in electronic devices, such as notebook computers, personal digital assistants (PDAs), flat panel TVs or mobile phones.

Figure 1A:
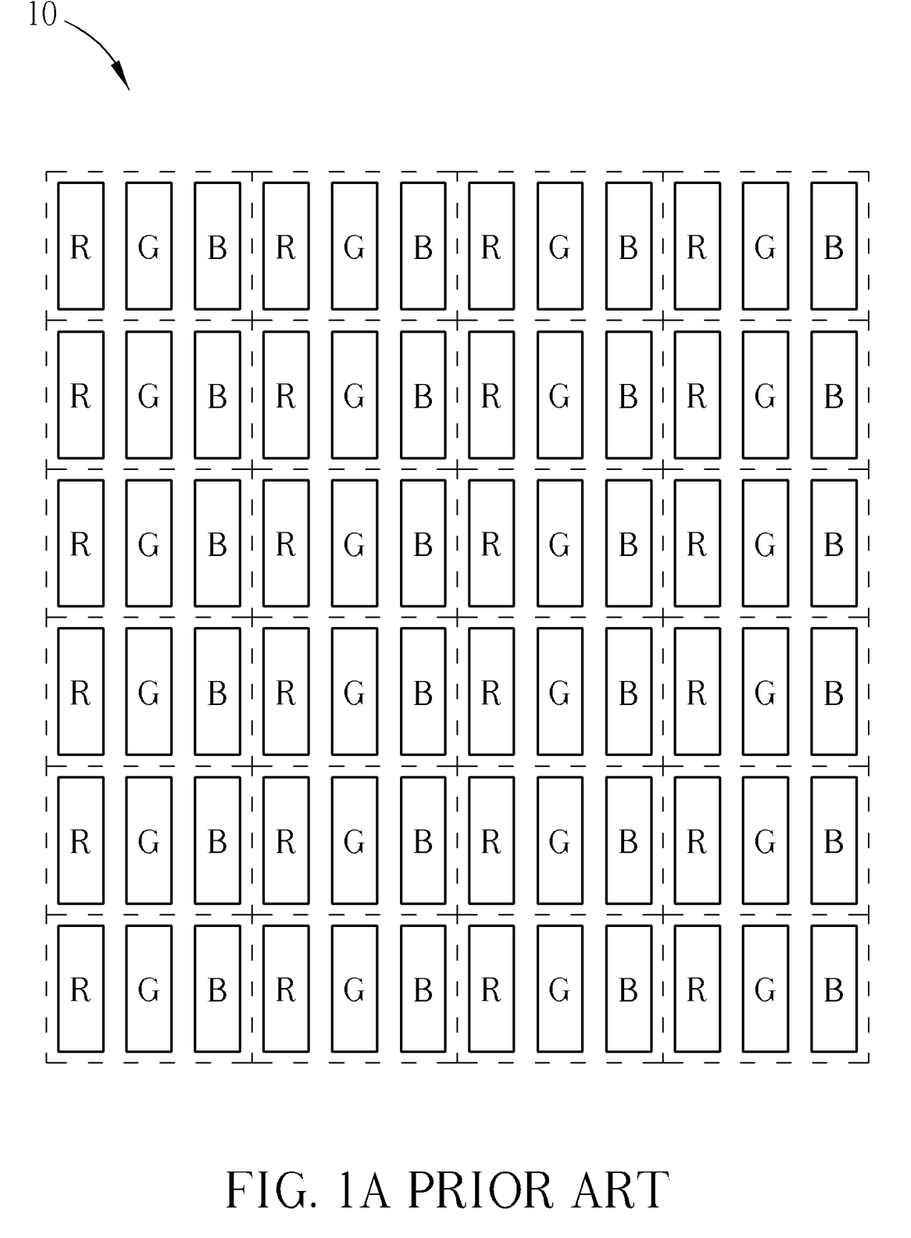
FIG. 1A is a schematic diagram illustrating partial area of a liquid crystal display (LCD) panel of the prior art.
Figure 1B:
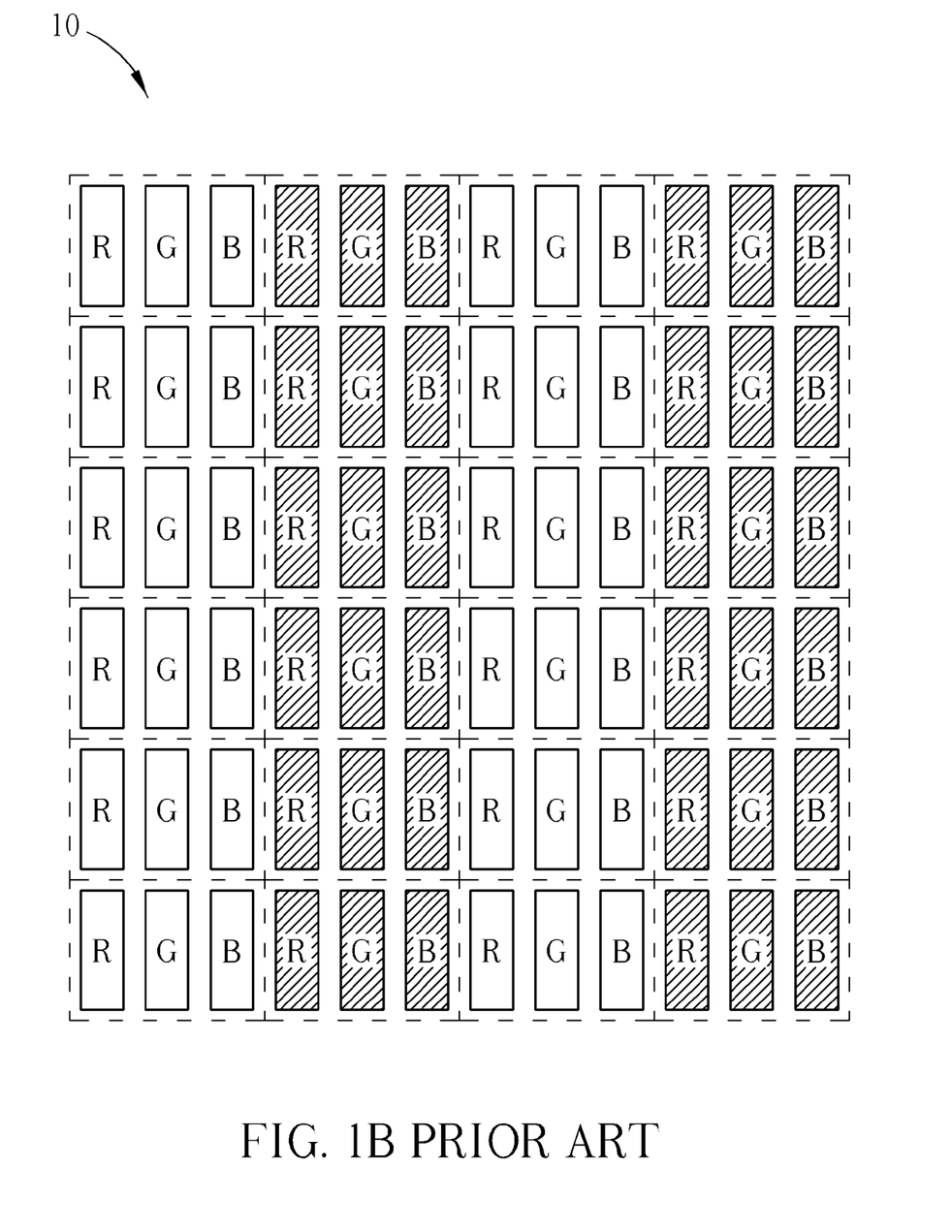
FIG. 1B is a schematic diagram illustrating horizontal resolution of the LCD panel of FIG. 1A.
Figure 1C:
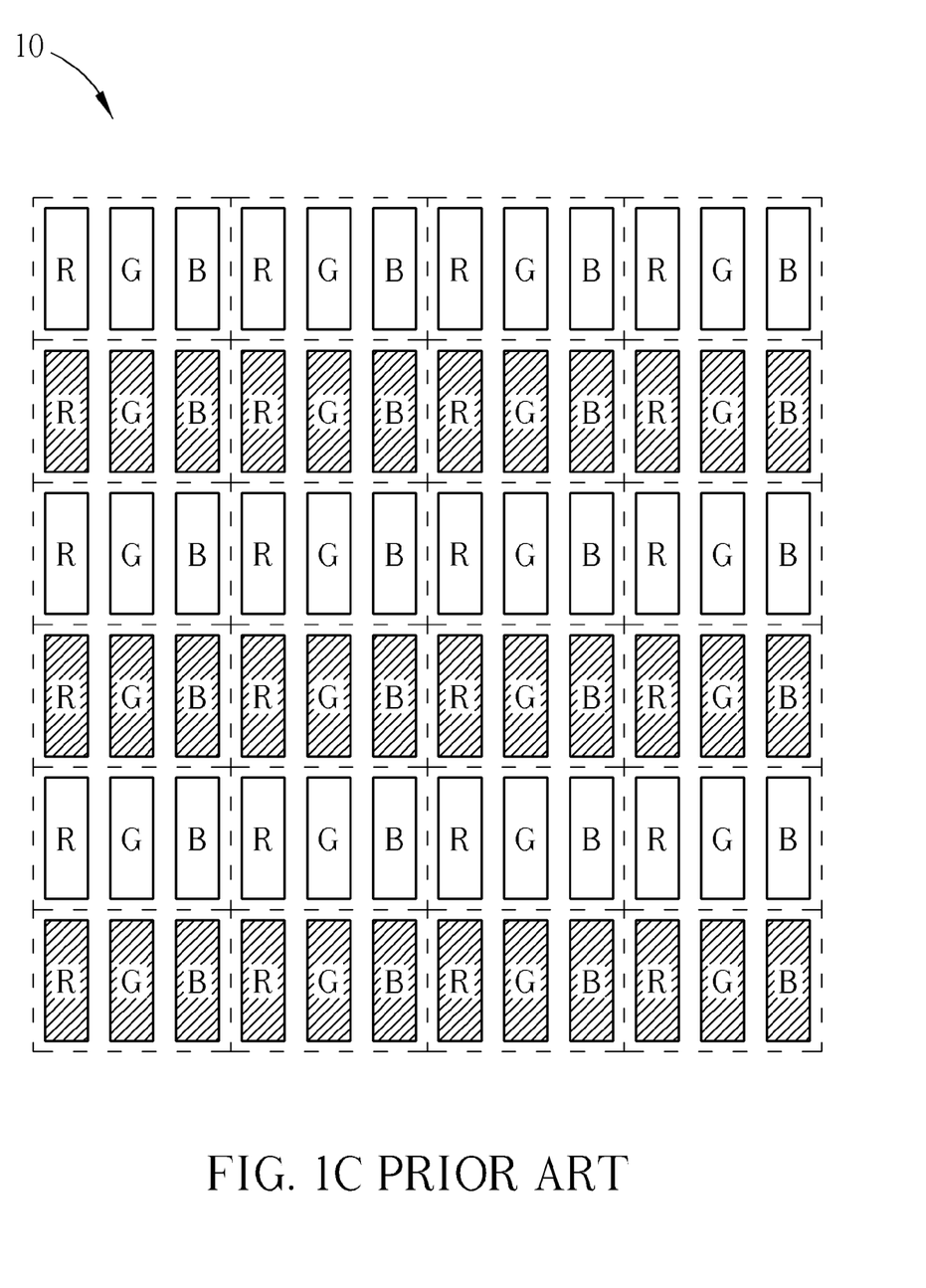
FIG. 1C is a schematic diagram illustrating vertical resolution of the LCD panel of FIG. 1A.

On an LCD panel, each pixel is composed of three kinds of sub-pixel units corresponding to three primary colors (red, green and blue) respectively. When displaying a specific color, the prior art adjusts gray levels of the red, green and blue sub-pixel units to compound the color. Note that, arrangement of the sub-pixel units directly affects resolution performance of the LCD panel. For example, the sub-pixel units can be arranged in a stripe format, so far the most popular arrangement for the LCD panel. Please refer to FIG. 1A, which is a schematic diagram illustrating a partial area of an LCD panel 10 of the prior art. The LCD panel 10 is composed of a plurality of pixel units, each separated by dotted lines in FIG. 1A and including a red sub-pixel unit R, a green sub-pixel unit G, and a blue sub-pixel unit B. In FIG. 1A, the red sub-pixel units R, the green sub-pixel units G and the blue sub-pixel units B are arranged in vertical stripes. In other words, each column of the LCD panel 10 is composed of sub-pixel units with the same color and utilized for representing red, green or blue. Please refer to FIG. 1B and FIG. 1C, which are schematic diagrams respectively illustrating horizontal and vertical resolutions of the LCD panel 10. In FIG. 1B and FIG. 1C, sub-pixel units with oblique lines are utilized for representing black. Therefore, the LCD panel 10 can demonstrate two vertical black-and-white lines or three horizontal black-and-white lines, preferably utilized for implying resolution performance thereof.

Figure 2A:
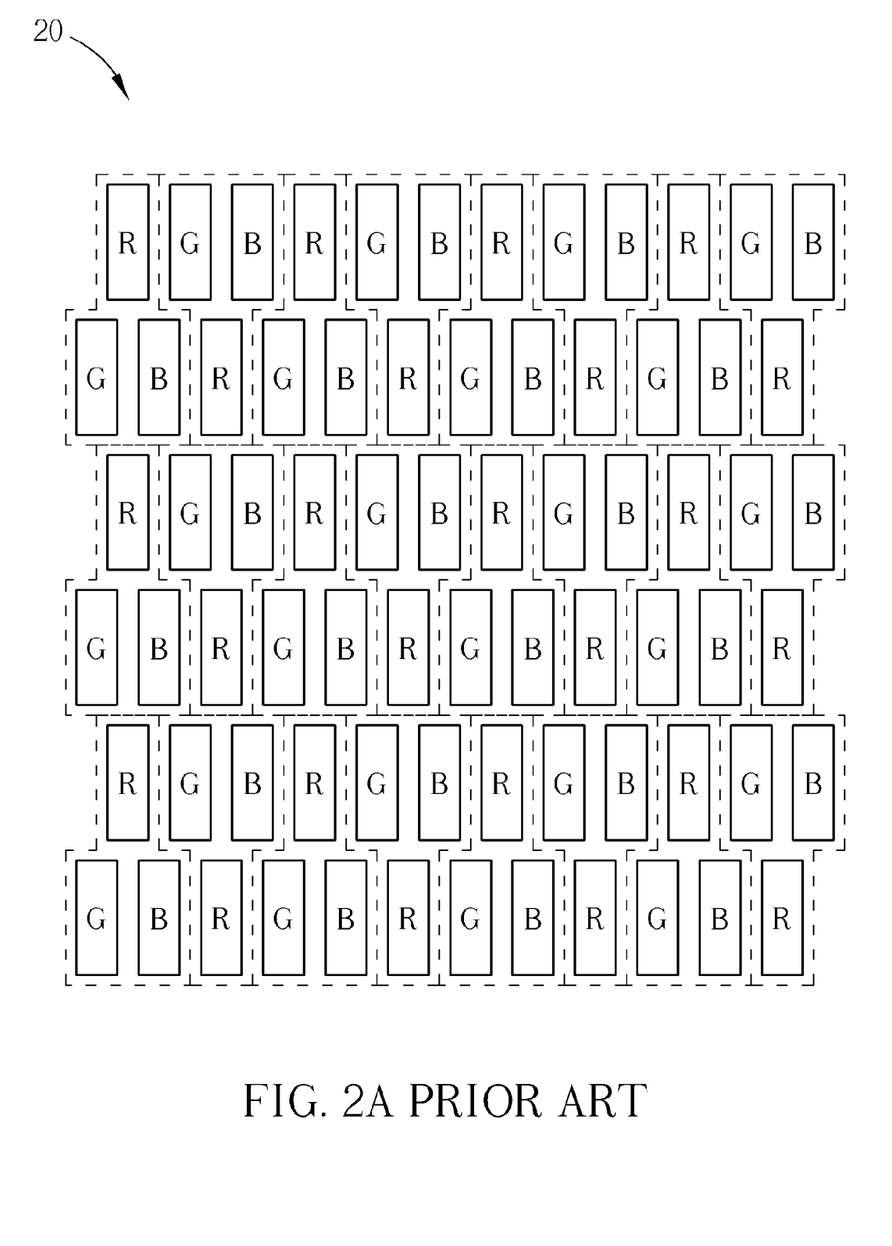
FIG. 2A is a schematic diagram illustrating partial area of a LCD panel of the prior art.
Figure 2B:
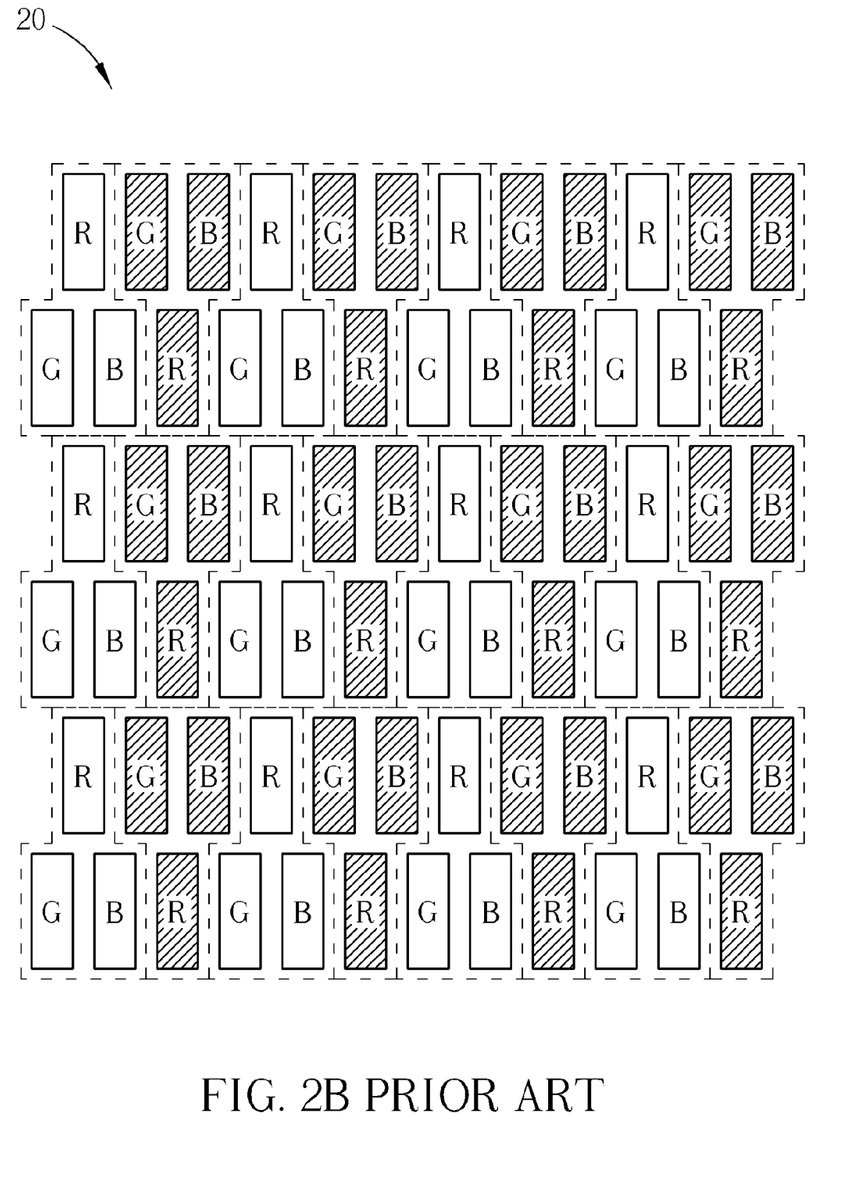
FIG. 2B is a schematic diagram illustrating horizontal resolution of the LCD panel of FIG. 2A.
Figure 2C:
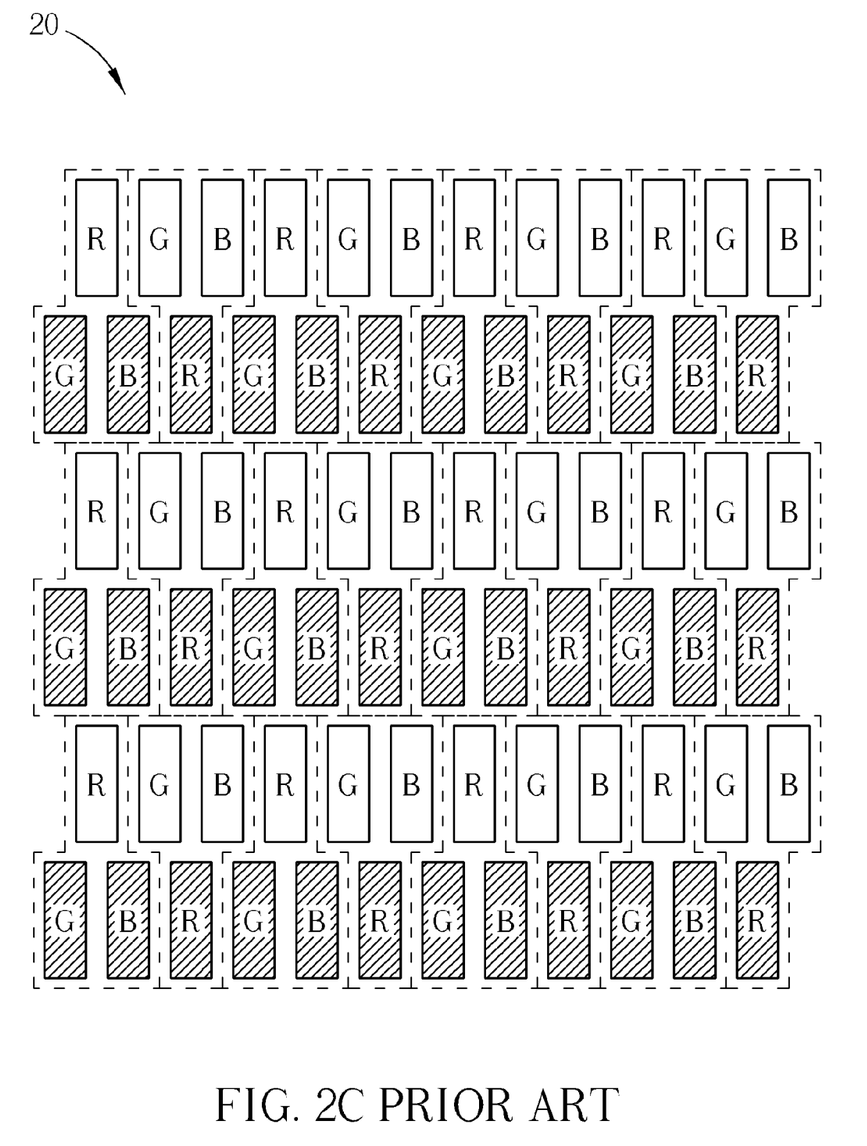
FIG. 2C is a schematic diagram illustrating vertical resolution of the LCD panel of FIG. 2A.

In addition to the stripe format, the sub-pixel units can be arranged in a delta format. Please refer to FIG. 2A, which is schematic diagram illustrating a partial area of an LCD panel 20 of the prior art. Similarly, each pixel unit of the LCD panel 20 is separated by dotted lines in FIG. 2A, and is composed of the red sub-pixel units R, the green sub-pixel units G and the blue sub-pixel units B, arranged as a delta. In general, the LCD panel 20 differs from the LCD panel 10 in having mismatched sub-pixel units in every two adjacent rows. Please refer to FIG. 2B and FIG. 2C, which are schematic diagrams respectively illustrating horizontal and vertical resolutions of the LCD panel 20. In this embodiment, the LCD panel 20 can demonstrate four vertical black-and-white lines or three horizontal black-and-white lines. That is, by mismatching the sub-pixel units in every two adjacent rows, the LCD panel 20 can achieve higher horizontal resolution.

However, regardless of whether the LCD panel 10 or the LCD panel 20 is employed, white light emitted from a back light unit of the LCD panel has to pass through color filters to filter out light of specific wavelengths, so as to display the designated colors on the LCD panel. That is, most of the light energy is exhausted in the color filters, leading to a waste of energy resources particularly disadvantageous in some low-power, high-brightness applications. Therefore, the know-how of reducing light-energy consumption and enhancing brightness performance without sacrificing resolution performance by rearranging the sub-pixel units of the LCD panel has been one objective focused on by the industry.

SUMMARY OF THE INVENTION

It is therefore a primary objective of the claimed invention to provide a liquid crystal display panel and display devices.

The present invention discloses a liquid crystal display panel, which comprises a substrate, and a plurality of display units arranged in a matrix form on the substrate, each corresponding to an element of a matrix and comprising a first sub-display unit, which comprises a first sub-pixel unit corresponding to a first color, a second sub-pixel unit corresponding to a second color arranged in a first diagonal direction against the first sub-pixel unit based on the matrix, a third sub-pixel unit corresponding to a third color arranged in a second diagonal direction against the second sub-pixel unit based on the matrix, and a fourth sub-pixel unit corresponding to a fourth color arranged in the first diagonal direction against the third sub-pixel unit based on the matrix, and a second sub-display unit adjacent to the first sub-display unit comprising a fifth sub-pixel unit corresponding to the third color, a sixth sub-pixel unit corresponding to the fourth color arranged in the first diagonal direction against the fifth sub-pixel unit based on the matrix, a seventh sub-pixel unit corresponding to the first color arranged in the second diagonal direction against the sixth sub-pixel unit based on the matrix, and an eighth sub-pixel unit corresponding to the second color arranged in the first diagonal direction against the seventh sub-pixel unit based on the matrix.

The present invention further discloses a display device, which comprises a liquid crystal display panel, which comprises a substrate, and a plurality of display units arranged in a matrix form on the substrate, each corresponding to an element of a matrix and comprising a first sub-display unit, which comprises a first sub-pixel unit corresponding to a first color, a second sub-pixel unit corresponding to a second color arranged in a first diagonal direction against the first sub-pixel unit based on the matrix, a third sub-pixel unit corresponding to a third color arranged in a second diagonal direction against the second sub-pixel unit based on the matrix, and a fourth sub-pixel unit corresponding to a fourth color arranged in the first diagonal direction against the third sub-pixel unit based on the matrix, and a second sub-display unit adjacent to the first sub-display unit, which comprises a fifth sub-pixel unit corresponding to the third color, a sixth sub-pixel unit corresponding to the fourth color arranged in the first diagonal direction against the fifth sub-pixel unit based on the matrix, a seventh sub-pixel unit corresponding to the first color arranged in the second diagonal direction against the sixth sub-pixel unit based on the matrix, and an eighth sub-pixel unit corresponding to the second color arranged in the first diagonal direction against the seventh sub-pixel unit based on the matrix, and a driving device for driving the LCD panel comprising a source driver for generating a plurality of source driving signals, a gate driver for generating a plurality of scanning signals, a plurality of first-type source driving lines, each coupled to the source driver and the first to fourth sub-pixel units for outputting corresponding source driving signals to the first to fourth sub-pixel units, a plurality of second-type source driving lines, each coupled to the source driver and the fifth to eighth sub-pixel units for outputting corresponding source driving signals to the fifth to eighth sub-pixel units, a plurality of first-type gate driving lines, each coupled to the gate driver, the first sub-pixel unit and the fifth sub-pixel unit for outputting corresponding scanning signals to the first sub-pixel unit and the fifth sub-pixel unit, a plurality of second-type gate driving lines, each coupled to the gate driver, the second sub-pixel unit and the sixth sub-pixel unit for outputting corresponding scanning signals to the second sub-pixel unit and the sixth sub-pixel unit, a plurality of third-type gate driving lines, each coupled to the gate driver, the third sub-pixel unit and the seventh sub-pixel unit for outputting corresponding scanning signals to the third sub-pixel unit and the seventh sub-pixel unit, and a plurality of fourth-type gate driving lines, each coupled to the gate driver, the fourth sub-pixel unit and the eighth sub-pixel unit for outputting corresponding scanning signals to the fourth sub-pixel unit and the eighth sub-pixel unit.

The present invention further discloses a display device, which comprises a liquid crystal display panel, which comprises a substrate, and a plurality of display units arranged in a matrix form on the substrate, each corresponding to an element of a matrix and comprising a first sub-display unit, which comprises a first sub-pixel unit corresponding to a first color, a second sub-pixel unit corresponding to a second color and arranged in a first diagonal direction against the first sub-pixel unit based on the matrix, a third sub-pixel unit corresponding to a third color and arranged in a second diagonal direction against the second sub-pixel unit based on the matrix, and a fourth sub-pixel unit corresponding to a fourth color and arranged in the first diagonal direction against the third sub-pixel unit based on the matrix, and a second sub-display unit adjacent to the first sub-display unit and comprising a fifth sub-pixel unit corresponding to the third color, a sixth sub-pixel unit corresponding to the fourth color and arranged in the first diagonal direction against the fifth sub-pixel unit based on the matrix, a seventh sub-pixel unit corresponding to the first color and arranged in the second diagonal direction against the sixth sub-pixel unit based on the matrix, and an eighth sub-pixel unit corresponding to the second color and arranged in the first diagonal direction against the seventh sub-pixel unit based on the matrix, and a driving device for driving the LCD panel comprising a source driver for generating a plurality of source driving signals, a gate driver for generating a plurality of scanning signals, a plurality of first-type source driving lines, each coupled to the source driver, the first sub-pixel unit and the third sub-pixel unit for outputting corresponding source driving signals to the first sub-pixel unit and the third sub-pixel unit, a plurality of second-type source driving lines, each coupled to the source driver, the second sub-pixel unit and the fourth sub-pixel unit for outputting corresponding source driving signals to the second sub-pixel unit and the fourth sub-pixel unit, a plurality of third-type source driving lines, each coupled to the source driver, the fifth sub-pixel unit and the seventh sub-pixel unit for outputting corresponding source driving signals to the fifth sub-pixel unit and the seventh sub-pixel unit, a plurality of fourth-type source driving lines, each coupled to the source driver, the sixth sub-pixel unit and the eighth sub-pixel unit for outputting corresponding source driving signals to the sixth sub-pixel unit and the eighth sub-pixel unit, a plurality of first-type gate driving lines, each coupled to the gate driver, the first sub-pixel unit, the second sub-pixel unit, the fifth sub-pixel unit and the sixth sub-pixel unit for outputting corresponding scanning signals to the first sub-pixel unit, the second sub-pixel unit, the fifth sub-pixel unit and the sixth sub-pixel unit, and a plurality of second-type gate driving lines, each coupled to the gate driver, the third sub-pixel unit, the fourth sub-pixel unit, the seventh sub-pixel unit and the eighth sub-pixel unit for outputting corresponding scanning signals to the third sub-pixel unit, the fourth sub-pixel unit, the seventh sub-pixel unit and the eighth sub-pixel unit.

These and other objectives of the present invention will no doubt become obvious to those of ordinary skill in the art after reading the following detailed description of the preferred embodiment that is illustrated in the various figures and drawings.

DETAILED DESCRIPTION

Figure 3A:
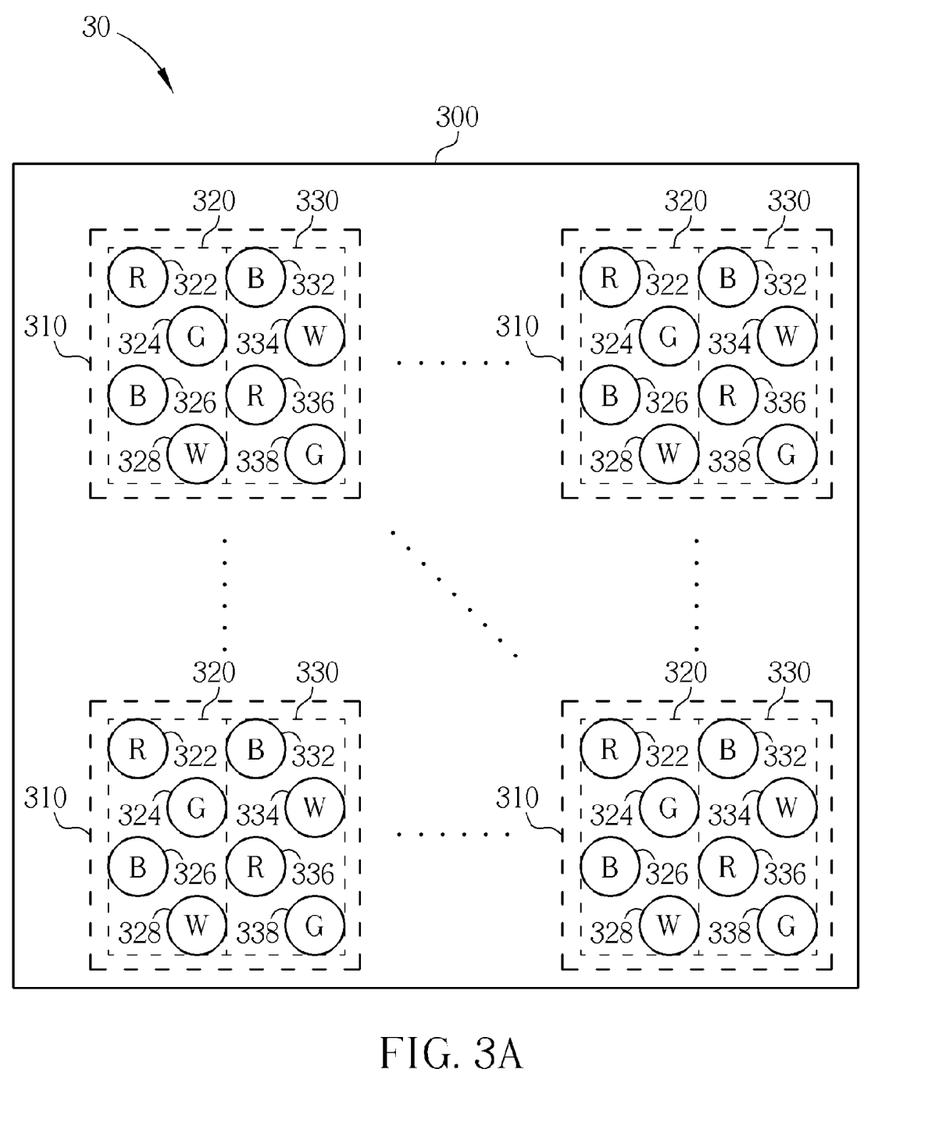
FIG. 3A is a schematic diagram of a LCD panel in accordance with an embodiment of the present invention.

Please refer to FIG. 3A, which is a schematic diagram of a liquid crystal display (LCD) panel 30 in accordance with an embodiment of the present invention. The LCD panel 30 comprises a substrate 300 and a plurality of display units 310. The display units 310 are arranged in a matrix form on the substrate 300. That is, for the LCD panel 30, each display unit 310 can be regarded as an element of a matrix. Each display unit 310 can be divided into a first sub-display unit 320 and a second sub-display unit 330. The first sub-display unit 320 comprises a first sub-pixel unit 322, a second sub-pixel unit 324, a third sub-pixel unit 326 and a fourth sub-pixel unit 328. Also, the second sub-display unit 330 comprises a fifth sub-pixel unit 332, a sixth sub-pixel unit 334, a seventh sub-pixel unit 336 and an eighth sub-pixel unit 338. In this embodiment, the first sub-pixel unit 322 and the seventh sub-pixel unit 336 are utilized for displaying red and accordingly labeled "R"; the second sub-pixel unit 324 and the eighth sub-pixel unit 338 are utilized for displaying green and accordingly labeled "G"; the third sub-pixel unit 326 and the fifth sub-pixel unit 332 are utilized for displaying blue and accordingly labeled "B"; finally, the fourth sub-pixel unit 328 and the sixth sub-pixel unit 334 are utilized for displaying white and accordingly labeled "W". In positional points of view, the second sub-display unit 330 is adjacent to the first sub-display unit 320. Based on the matrix form, the second sub-pixel unit 324 is arranged in a lower-right diagonal direction against the first sub-pixel unit 322; the third sub-pixel unit 326 is arranged in a lower-left diagonal direction against the second sub-pixel unit 324; the fourth sub-pixel unit 328 is arranged in the lower-right diagonal direction against the third sub-pixel unit 326; the sixth sub-pixel unit 334 is arranged in the lower-right diagonal direction against the fifth sub-pixel unit 332; the seventh sub-pixel unit 336 is arranged in the lower-left diagonal direction against the sixth sub-pixel unit 334; and, the eighth sub-pixel unit 338 is arranged in the lower-right diagonal direction against the seventh sub-pixel unit 336.

Figure 3B:
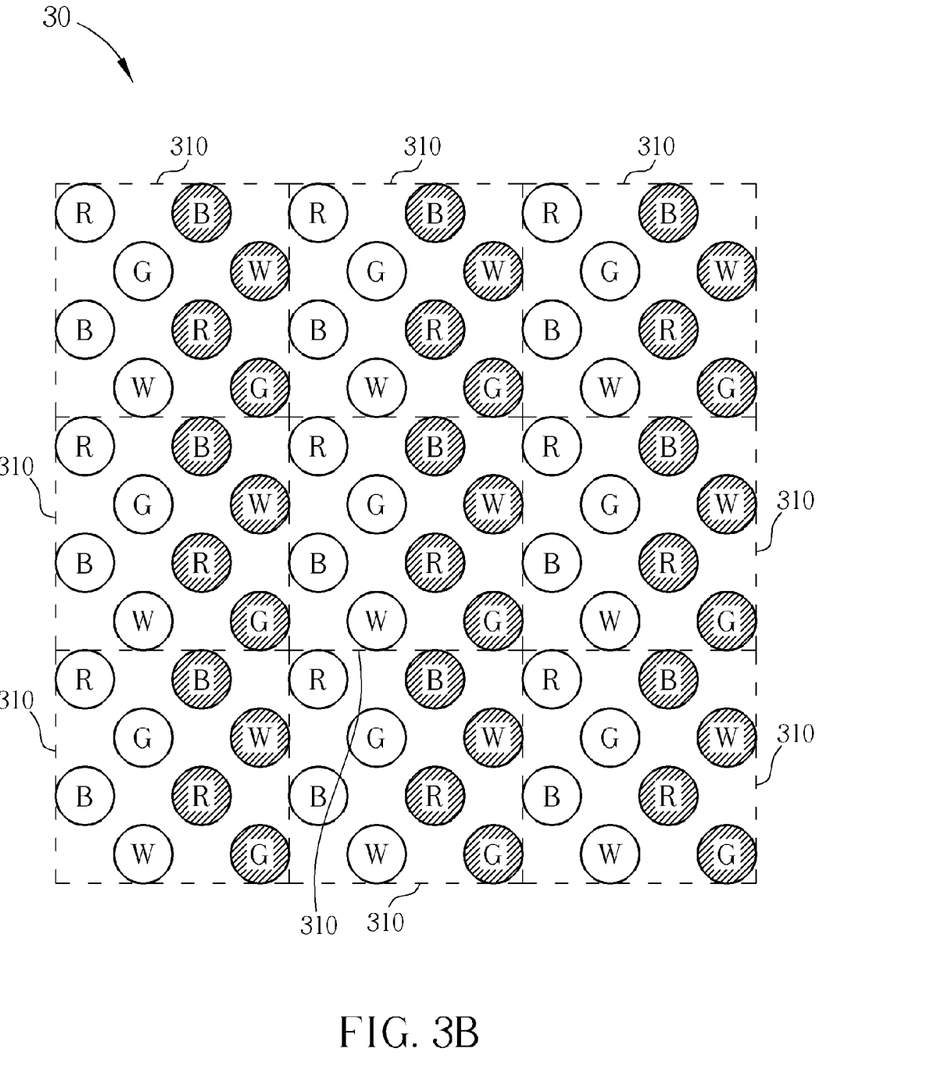
FIG. 3B is a schematic diagram illustrating horizontal resolution of the LCD panel of FIG. 3A.
Figure 3C:
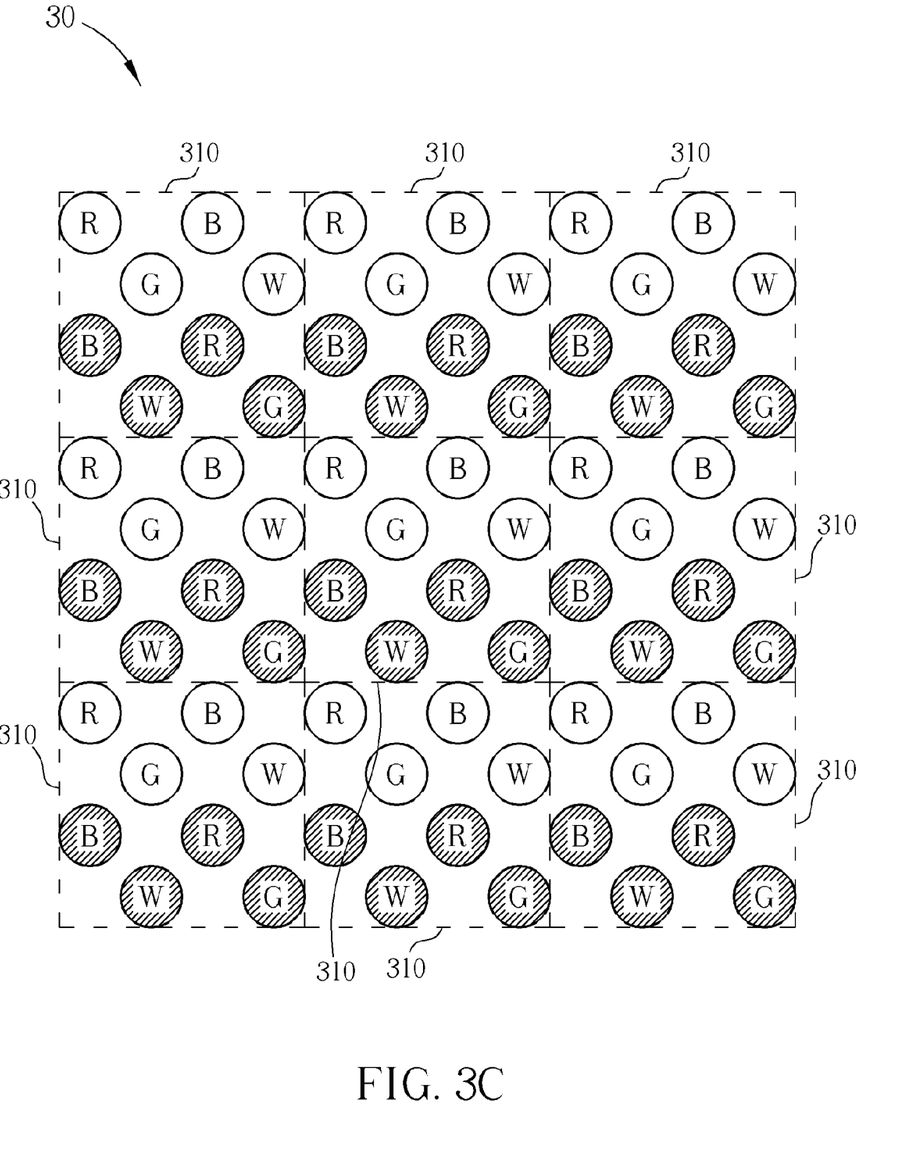
FIG. 3C is a schematic diagram illustrating vertical resolution of the LCD panel of FIG. 3A.

In the LCD panel 30, the first sub-display unit 320 and the second sub-display unit 330 correspond functionally to the pixel unit of the prior art and are utilized for displaying various colors. Note that, in addition to the three primary colors (red, green and blue), the first sub-display unit 320 and the second sub-display unit 330 respectively include the fourth sub-pixel unit 328 and the sixth sub-pixel unit 334 for displaying white, which is particularly advantageous when displaying bright colors and can reduce the portion of light energy exhausted while passing through the LCD panel 30, so as to save power. In short, the display units 310 are arranged in the matrix form and distributed all over the substrate 300 to display desired images. From the standpoint of resolution performance, with 72 illustrative sub-pixel units exactly as same as in FIG. 1A, the LCD panel 30 can demonstrate three vertical black-and-white lines or three horizontal black-and-white lines, as respectively illustrated in FIG. 3B and FIG. 3C. Therefore, in comparison with the LCD panel 10 most popular among the prior art, the LCD panel 30 can enhance the horizontal resolution by 1.5 times.

Figure 3D:
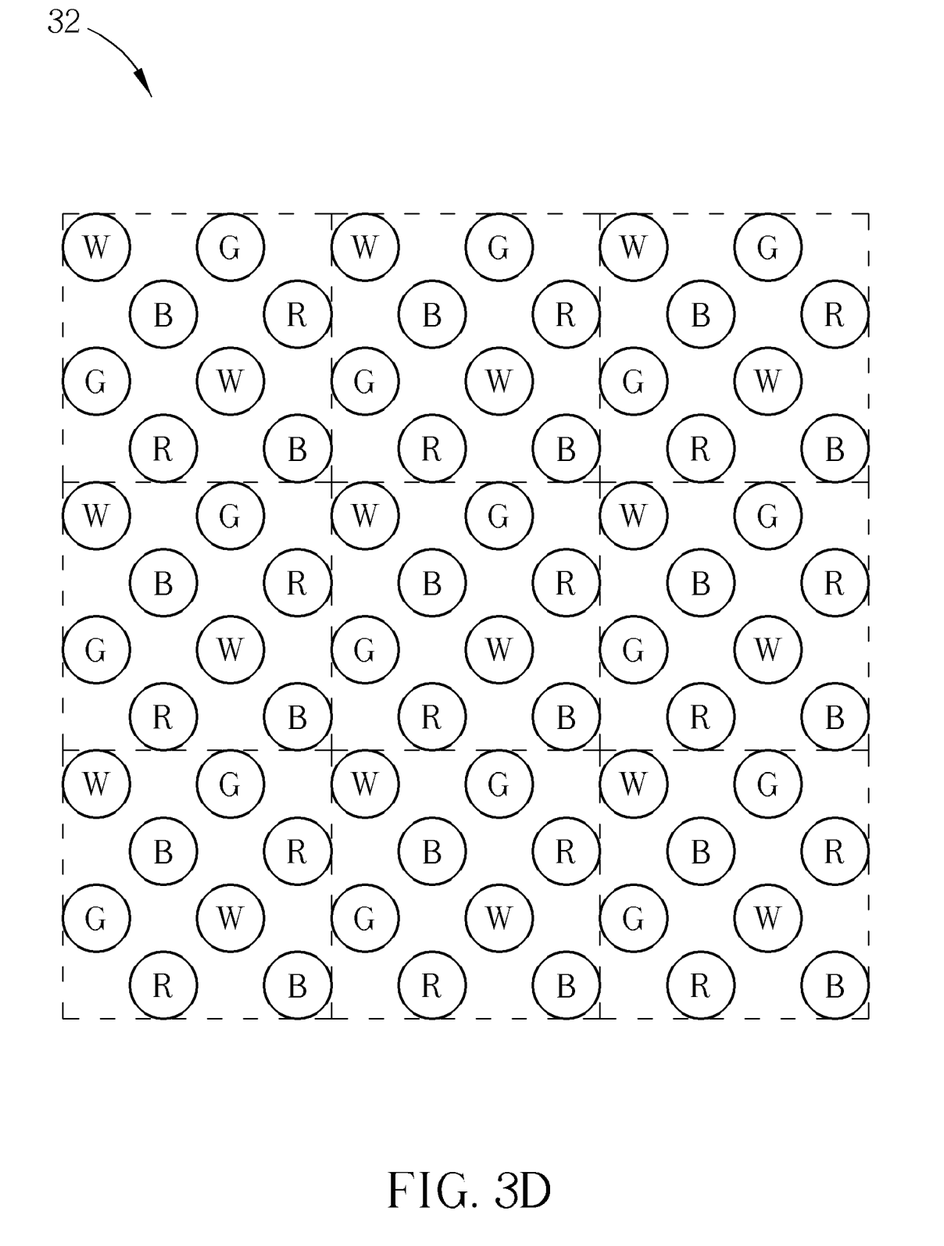
FIG. 3D is a schematic diagram of a LCD panel in accordance with an alternative embodiment of the present invention.

In FIG. 3A, the first to eighth sub-pixel units 322-338 correspond respectively to red, green, blue, white, blue, white, red and green. Certainly, those skilled in the art can rearrange the order. For example, please refer to FIG. 3D, which is a schematic diagram of an LCD panel 32 in accordance with an alternative embodiment of the present invention. In FIG. 3D, green and blue are swapped in the order, and so are red and white. Other than that, the LCD panel 32 functions substantially the same as the LCD panel 30.

Figure 4:
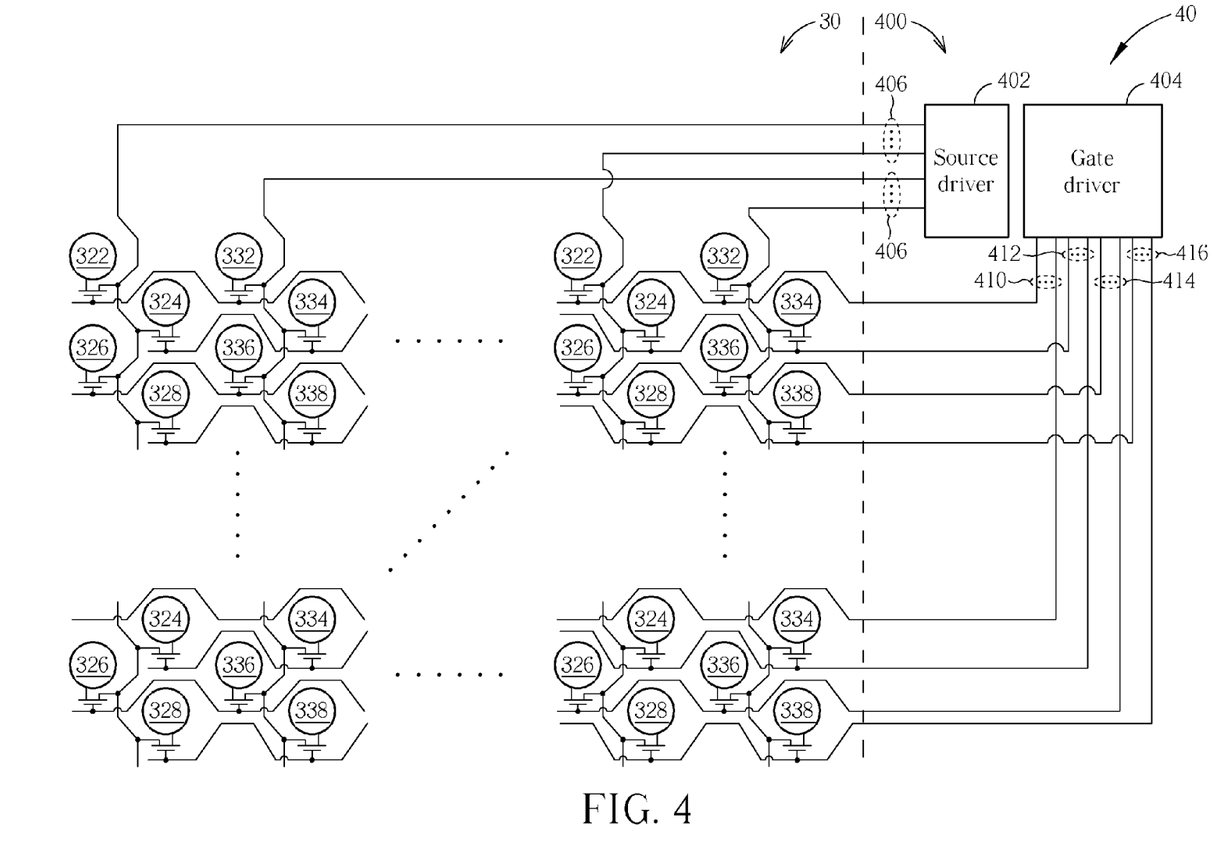
FIG. 4 is a schematic diagram of a display device in accordance with an embodiment of the present invention.

With respect to driving methods of the LCD panel 30, please refer to FIG. 4, which is a schematic diagram of a display device 40 in accordance with an embodiment of the present invention. Note that, partial marks of the LCD panel 30 are omitted in FIG. 4 for the sake of clearness. Please refer to the description of FIG. 3A for those details. In addition to the LCD panel 30, the display device 40 further includes a driving device 400 for driving the LCD panel 30. The driving device 400 comprises a source driver 402, a gate driver 404, a plurality of first-type source driving lines 406, a plurality of second-type source driving lines 408, a plurality of first-type gate driving lines 410, a plurality of second-type gate driving lines 412, a plurality of third-type gate driving lines 414 and a plurality of fourth-type gate driving lines 416. The source driver 402 is utilized for generating source driving signals, and the gate driver 404 is utilized for generating scanning signals. Each first-type source driving line 406 is coupled to the source driver 402 and the first to fourth sub-pixel units 322, 324, 326, 328, and is utilized for outputting corresponding source driving signals to the first to fourth sub-pixel units 322, 324, 326, 328. Similarly, each second-type source driving line 408 is coupled to the source driver 402 and the fifth to eighth sub-pixel units 332, 334, 336, 338, and is utilized for outputting corresponding source driving signals to the fifth to eighth sub-pixel units 332, 334, 336, 338. Each first-type gate driving line 410 is coupled to the gate driver 404, the first sub-pixel unit 322 and the fifth sub-pixel unit 332, and is utilized for outputting corresponding scanning signals to the first sub-pixel unit 322 and the fifth sub-pixel unit 332. Each second-type gate driving line 412 is coupled to the gate driver 404, the second sub-pixel unit 324 and the sixth sub-pixel unit 334, and is utilized for outputting corresponding scanning signals to the second sub-pixel unit 324 and the sixth sub-pixel unit 334. Each third-type gate driving line 414 is coupled to the gate driver 404, the third sub-pixel unit 326 and the seventh sub-pixel unit 336, and is utilized for outputting corresponding scanning signals to the third sub-pixel unit 326 and the seventh sub-pixel unit 336. Each fourth-type gate driving line 416 is coupled to the gate driver 404, the fourth sub-pixel unit 328 and the eighth sub-pixel unit 338, and is utilized for outputting corresponding scanning signals to the fourth sub-pixel unit 328 and the eighth sub-pixel unit 338.

In short, for each sub-pixel unit, the source driver 402 and the gate driver 404 are respectively utilized for generating corresponding source driving signals and scanning signals sent to the sub-pixel unit via the corresponding source or gate driving line so as to update color intensity of the sub-pixel unit. For each display unit 310, the source driving lines 406, 408 are respectively utilized for driving the sub-pixel units of the first sub-display unit 320 and the sub-pixel units of the second sub-display unit 330, and the gate driving lines 410, 412, 414, 416 are respectively utilized for driving the two sub-pixel units on each row of the display unit 310.

Figure 5:
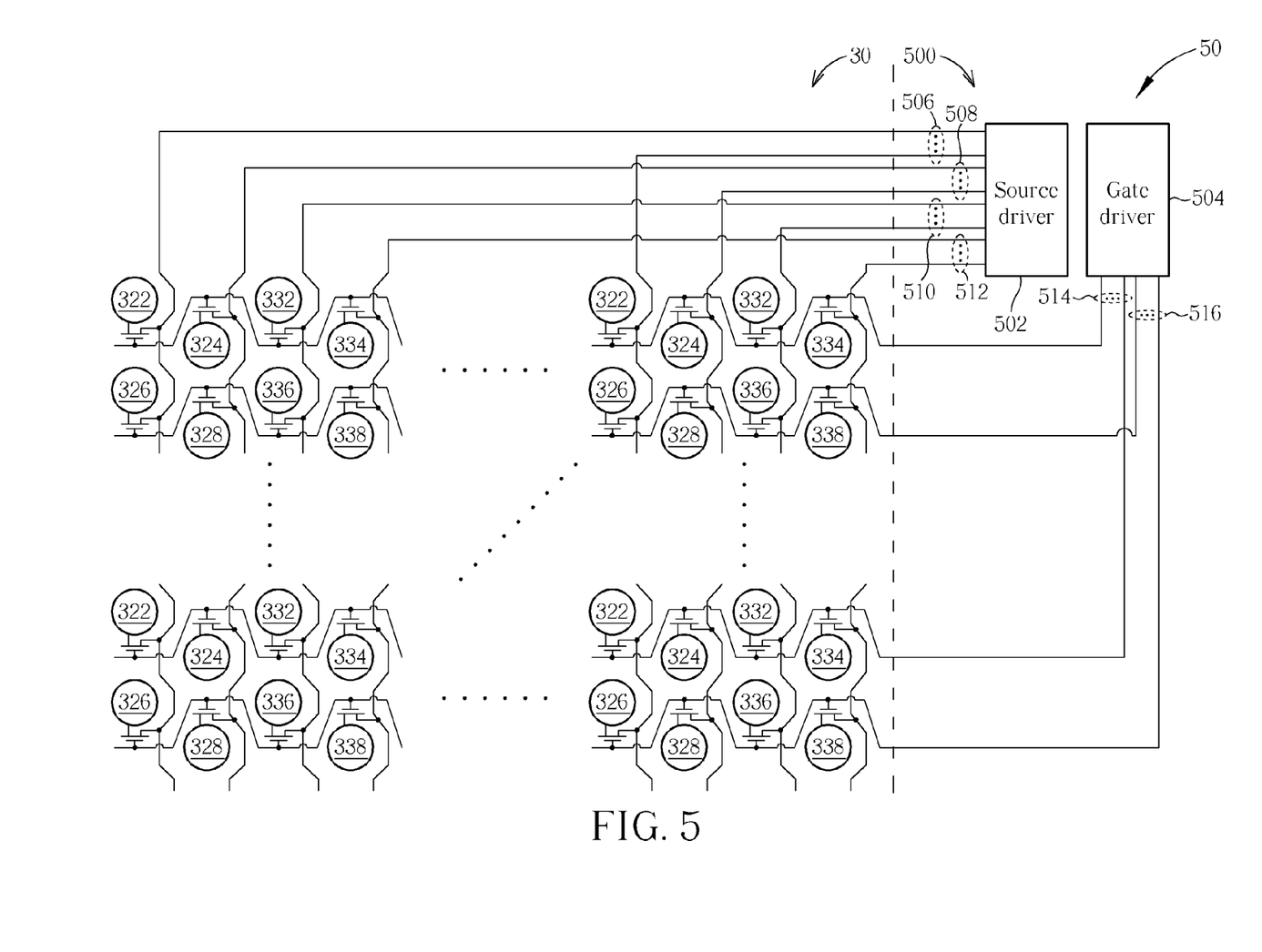
FIG. 5 is a schematic diagram of a display device in accordance with an alternative embodiment of the present invention.

In addition to the display device 40, the present invention further provides a display device 50, as illustrated in FIG. 5. Similarly, the display device 50 includes a driving device 500 which includes a source driver 502 and a gate driver 504 respectively utilized for generating the source driving signals and the scanning signals. The display device 50 differs from the display device 40 in driving lines. In detail, the display unit 50 replaces driving lines 406-416 with a plurality of first-type source driving lines 506, a plurality of second-type source driving lines 508, a plurality of third-type source driving lines 510, a plurality of fourth-type source driving lines 512, a plurality of first-type gate driving lines 514 and a plurality of second-type gate driving lines 516. Functions and connection methods of the driving lines 506-516 can be analogized from above description of the driving lines 406-416, and are not further narrated. In general, the correlations between the driving lines and the sub-pixel units in the display device 40 are reassigned in the display device 50. In greater detail, for each display unit 310, the source driving lines 506, 508, 510, 512 are respectively utilized for driving the two sub-pixel units on each column of the display unit 310, and the gate driving lines 514, 516 are respectively utilized for driving the four sub-pixel units on the first two rows of the display unit 310 and the four sub-pixel units on the last two rows of the display unit 310, as illustrated in FIG. 5.

In the prior art, the stripe-patterned LCD panel 10 and the delta-patterned LCD panel 20 both utilize red, green and blue sub-pixel units R, G, B. With 72 illustrative sub-pixel units (see FIG. 1A to FIG. 2C), the LCD panel 10 can demonstrate two vertical black-and-white lines or three horizontal black-and-white lines, and the LCD panel 20 can demonstrate four vertical black-and-white lines or three horizontal black-and-white lines. In comparison, also with 72 illustrative sub-pixel units (see FIG. 3B, FIG. 3C), the present invention utilizes red, green, blue and white sub-pixel units R, G, B, W, and can demonstrate three vertical black-and-white lines or three horizontal black-and-white lines. That is, by rearranging the sub-pixel units and applying the white sub-pixel unit W, the present invention can reduce light-energy consumption and enhance brightness performance without sacrificing resolution performance. If compared with the LCD panel 10, the present invention even can achieve higher resolution.

To sum up, for the LCD panel, the present invention can reduce light-energy consumption and enhance brightness performance without sacrificing resolution performance; corresponding driving devices are also provided, such that the display device can drive the LCD panel correctly.

Those skilled in the art will readily observe that numerous modifications and alterations of the device and method may be made while retaining the teachings of the invention.

What is claimed is:

1. A display device comprising:
   a liquid crystal display (LCD) panel, comprising:
      a substrate; and
      a plurality of display units, arranged in a matrix form on the substrate, each corresponding to an element of a matrix and comprising:
         a first sub-display unit, comprising:
            a first sub-pixel unit, corresponding to a first color;
            a second sub-pixel unit, corresponding to a second color, arranged in a first diagonal direction against the first sub-pixel unit based on the matrix;
            a third sub-pixel unit, corresponding to a third color, arranged in a second diagonal direction against the second sub-pixel unit based on the matrix; and
            a fourth sub-pixel unit, corresponding to a fourth color, arranged in the first diagonal direction against the third sub-pixel unit based on the matrix; and
         a second sub-display unit, adjacent to the first sub-display unit, comprising:
            a fifth sub-pixel unit, corresponding to the third color;
            a sixth sub-pixel unit, corresponding to the fourth color, arranged in the first diagonal direction against the fifth sub-pixel unit based on the matrix;
            a seventh sub-pixel unit, corresponding to the first color, arranged in the second diagonal direction against the sixth sub-pixel unit based on the matrix; and
            an eighth sub-pixel unit, corresponding to the second color, arranged in the first diagonal direction against the seventh sub-pixel unit based on the matrix; and
   a driving device, for driving the LCD panel, comprising:
      a source driver, for generating a plurality of source driving signals;
      a gate driver, for generating a plurality of scanning signals;
      a plurality of first-type source driving lines, each electrically coupled to the source driver, the first sub-pixel unit and the third sub-pixel unit, for outputting corresponding source driving signals to the first sub-pixel unit and the third sub-pixel unit;
      a plurality of second-type source driving lines, each electrically coupled to the source driver, the second sub-pixel unit and the fourth sub-pixel unit, for outputting corresponding source driving signals to the second sub-pixel unit and the fourth sub-pixel unit;
      a plurality of third-type source driving lines, each electrically coupled to the source driver, the fifth sub-pixel unit and the seventh sub-pixel unit, for outputting corresponding source driving signals to the fifth sub-pixel unit and the seventh sub-pixel unit;
      a plurality of fourth-type source driving lines, each electrically coupled to the source driver, the sixth sub-pixel unit and the eighth sub-pixel unit, for outputting corresponding source driving signals to the sixth sub-pixel unit and the eighth sub-pixel unit;
      a plurality of first-type gate driving lines, each electrically coupled to the gate driver, the first sub-pixel unit, the second sub-pixel unit, the fifth sub-pixel unit and the sixth sub-pixel unit, for outputting corresponding scanning signals to the first sub-pixel unit, the second sub-pixel unit, the fifth sub-pixel unit and the sixth sub-pixel unit; and
      a plurality of second-type gate driving lines, each electrically coupled to the gate driver, the third sub-pixel unit, the fourth sub-pixel unit, the seventh sub-pixel unit and the eighth sub-pixel unit, for outputting corresponding scanning signals to the third sub-pixel unit, the fourth sub-pixel unit, the seventh sub-pixel unit and the eighth sub-pixel unit.

2. The display device of claim 1, wherein the first color is red, the second color is green, the third color is blue, and the fourth color is white.

3. The display device of claim 1, wherein the first diagonal direction is the lower-right direction.

4. The display device of claim 1, wherein the second diagonal direction is the lower-left direction.

* * * * *